Figures 1, 2:
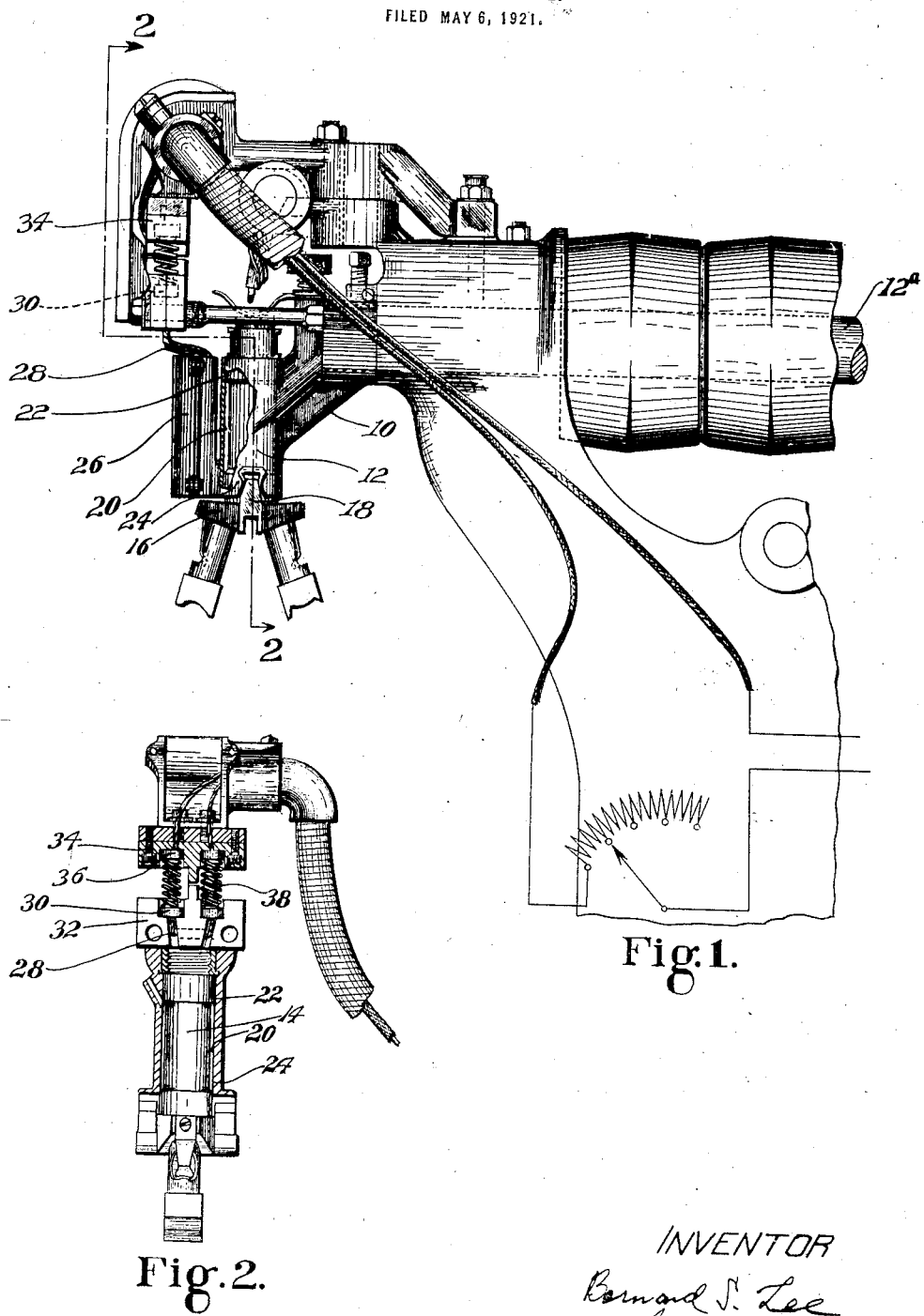

Jan. 30, 1923.  1,443,419

B. S. LEE.
BURNISHING MACHINE.
FILED MAY 6, 1921.

INVENTOR
Bernard S. Lee
By his Attorney,
Nelson R. Harvard

Patented Jan. 30, 1923.

1,443,419

UNITED STATES PATENT OFFICE.

BERNARD S. LEE, OF BEVERLY, MASSACHUSETTS, ASSIGNOR TO UNITED SHOE MACHINERY CORPORATION, OF PATERSON, NEW JERSEY, A CORPORATION OF NEW JERSEY.

BURNISHING MACHINE.

Application filed May 6, 1921. Serial No. 467,370.

*To all whom it may concern:*

Be it known that I, BERNARD S. LEE, a citizen of the United States, residing at Beverly, in the county of Essex and State of Massachusetts, have invented certain Improvements in Burnishing Machines, of which the following description, in connection with the accompanying drawings, is a specification, like reference characters on the drawings indicating like parts in the several figures.

This invention refers to electrically operated machines and is disclosed in connection with an electrically heated edge setter or machine for burnishing the sole edges of boots and shoes. The general organization of the machine is substantially as shown in United States Letters Patent granted on application of Furber, No. 1,284,302, and it is one of the objects of the present invention to improve the performance of this machine under certain circumstances. In using the Furber machine under certain conditions of work, or with an operator who was careless about turning off the electric energy when it was not being used, it was found that the spindle upon which the edge setting tools were suspended and which is rotated in its socket to interchange them, sometimes became too hot with the result that the lubricating oil became carbonized and the spindle did not work as freely as it should. These and certain other difficulties are overcome by the present invention.

An important feature of the invention resides in connecting the unit carrying casing to the spindle carrying casing over only a limited cross-sectional area, this area being preferably located as closely as possible to the tools themselves. This avoids directly heating any more of the spindle than is absolutely necessary and permits the greater part of the spindle to be utilized to dissipate that portion of the heat which tends to carbonize its lubricating oil.

Another feature of the invention consists in providing ample clearance between the spindle and its supporting casing except at the places where a machine bearing is necessary. It has been found that the spindle will operate successfully without having a close bearing all along its bearing and the ample clearance provided by the present invention avoids to a certain extent the overheating and provides an oil pocket whereby the lubrication is improved.

These and other features of the invention comprising certain combinations and arrangements of parts will be understood from the following description of a preferred embodiment thereof selected for purposes of illustration and shown in the accompanying drawings in which, Fig. 1 is a side view of the machine.

Fig. 2 is a front elevation, partly in section.

The structure of the machine is substantially that described in the cited patent and need not be gone into in great detail in this application. The tool carrier 10 is oscillated by the shaft 12ª which is actuated in any desired manner. It carries a vertical, cylindrical socket 12 in which is mounted the spindle 14 carrying the forked tool holder 16 at its lower end. This tool holder is locked against rotation by a latch 18 engaging it and the socket 12 and can be rotated by unlatching and then twisting the latch, as described in the patent referred to. The spindle is cut away as shown at 20, having a machine bearing in the socket only at its lower and upper ends as shown at 22 and 24. The clearance 20 between the spindle and socket provides an oil pocket and avoids sticking due to any carbonization.

Mounted in front of the socket 12 is the unit carrying casing 26. This casing, as shown, is connected to the socket 12 only at its lower portion, preferably as close to the holder 16 as possible. This structure prevents direct transference of heat from the unit casing into the main body of the socket 12 and thence into the spindle, the heating being transferred into the socket only in the neighborhood indicated by 24. The spindle is kept cool by virtue of being heated only at one end, the main body of it acting to dissipate the heat thus received. The leads 28 of the electric unit run to terminal blocks 30 mounted in a suitable insulating plate 32 fixedly mounted upon the oscillating carrier 10. In the head of the machine, shown directly above the block 32, is a corresponding block 34 carrying similar terminal blocks 36 directly opposite the blocks 30, respectively. The blocks 36 being on the fixed frame of the machine are connected to the mains in any desired way.

Extending between the blocks 36 and 32 are spiral springs 38 for conducting electrical energy from one to the other. These springs have their axes substantially straight; are not long as compared with their diameter, and are preferably under compression in order to retain them in working contact with the terminal blocks without the necessity of binding screws which would bruise and weaken them at the points of attachment. Their axes are substantially at right angles to the axes of oscillation of the tool carrier 10, and the oscillation of the carrier 10 causes a direct axial compression of each, in alternation. The use of spiral springs under compression for transferring electrical energy from a fixed to a moving part is not claimed broadly herein, being the invention of F. E. Boothroyd, described and claimed in Patent No. 1,410,053, granted March 21, 1922, but I am the first to use such springs in the position shown with their axes perpendicular to the axis of oscillation of the moving tool carrier.

Having described my invention, what I claim as new and desire to secure by Letters Patent of the United States is:—

1. In a machine of the class described, an oscillating tool holder, a tool carrying spindle rotatable in said holder to interchange the tools carried by said spindle, and an electric unit connected to said holder, said spindle being formed with a substantial clearance between it and said holder over more than one half of its extent to avoid overheating.

2. In a machine of the class described, an oscillating tool holder, a socket in said holder, a tool carrying spindle rotatable in said socket and an electric heating unit connected to said socket adjacent one end only to avoid overheating said socket and spindle.

3. In a machine of the class described, an oscillating tool holder, a socket in said holder, a rotatable tool carrier spindle in said socket, said spindle having a bearing at its ends only and being formed between its ends with a substantial clearance extending over more than one-half of its length, and an electric unit mounted upon said holder at one end of said socket for heating the tools carried by said spindle.

4. In a machine of the class described, an oscillating tool holder, a tool on said holder, an electric unit on said holder for heating said tool, and a lead for said unit comprising a spiral spring with its axis substantially straight and perpendicular to the axis of oscillation of said holder, said spring extending between said oscillating holder and the fixed frame of the machine.

5. In a machine of the class described, an oscillating tool holder, a tool on said holder, an electric unit on said holder for heating said tool, and a lead for said unit comprising a spiral spring with its axis substantially straight and perpendicular to the axis of oscillation of said holder, said spring being in a state of compression and extending between said oscillating holder and the fixed frame of the machine.

In testimony whereof I have signed my name to this specification.

BERNARD S. LEE.